(12) United States Patent
Le Leannec et al.

(10) Patent No.: US 9,185,419 B2
(45) Date of Patent: Nov. 10, 2015

(54) METHOD AND DEVICE FOR CODING A SEQUENCE OF IMAGES

(75) Inventors: Fabrice Le Leannec, Mouaze (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 13/186,945

(22) Filed: Jul. 20, 2011

(65) Prior Publication Data

US 2012/0020582 A1   Jan. 26, 2012

(30) Foreign Application Priority Data

Jul. 23, 2010 (FR) ...................................... 10 56071

(51) Int. Cl.
| | |
|---|---|
| G06K 9/36 | (2006.01) |
| H04N 19/167 | (2014.01) |
| H04N 19/176 | (2014.01) |
| H04N 19/147 | (2014.01) |
| H04N 19/102 | (2014.01) |
| H04N 19/174 | (2014.01) |
| H04N 19/17 | (2014.01) |

(Continued)

(52) U.S. Cl.
CPC ........... *H04N 19/167* (2014.11); *H04N 19/102* (2014.11); *H04N 19/147* (2014.11); *H04N 19/17* (2014.11); *H04N 19/174* (2014.11); *H04N 19/176* (2014.11); *H04N 19/19* (2014.11); *H04N 19/192* (2014.11)

(58) Field of Classification Search
CPC .................. H04N 19/00012; H04N 19/00175; H04N 19/00248; H04N 19/0026; H04N 19/00272; H04N 19/00278; H04N 19/00351; H04N 19/00357; H04N 19/102; H04N 19/147; H04N 19/167; H04N 19/17; H04N 19/174; H04N 19/176; H04N 19/19; H04N 19/192
USPC .................... 382/239, 243, 233, 378, 240.24, 382/240.17, 240.02, 240.09; 375/240.24, 375/240.17, 240.02, 240.09; 708/402
See application file for complete search history.

(56) References Cited

U.S. PATENT DOCUMENTS

| | | | | |
|---|---|---|---|---|
| 5,995,668 | A | * | 11/1999 | Corset et al. .................. 382/233 |
| 8,019,804 | B2 | * | 9/2011 | Po et al. ........................ 708/402 |

(Continued)

FOREIGN PATENT DOCUMENTS

| | | |
|---|---|---|
| EP | 1315380 A2 | 5/2003 |
| FR | 2889381 A1 | 2/2007 |
| WO | WO2006094001 A2 | 9/2006 |

OTHER PUBLICATIONS

Lainema et al., "Appratus, method and computer program for video coding", pp. 58, Jan. 8, 2010.*

*Primary Examiner* — Mekonen Bekele

(74) *Attorney, Agent, or Firm* — Canon U.S.A., Inc. IP Division

(57) ABSTRACT

A method of coding a sequence of images comprises at least one image comprising an image region of interest.

The coding method comprises the following steps implemented for said at least one image of said sequence of images:
  determining (S10 to S23) an image portion comprising the image region of interest on the basis of a rate-distortion criterion representing a compromise between the compression efficiency the distortion of the image portion and the compression efficiency the distortion of the whole of said at least one image; and
  coding (S24) said at least one image on the basis of the determined image portion.

18 Claims, 8 Drawing Sheets

(51) Int. Cl.
*H04N 19/19* (2014.01)
*H04N 19/192* (2014.01)

(56) References Cited

U.S. PATENT DOCUMENTS

| | | | |
|---|---|---|---|
| 8,213,515 B2* | 7/2012 | Kudana et al. | 375/240.17 |
| 8,223,836 B2* | 7/2012 | Wu et al. | 375/240.09 |
| 8,548,041 B2* | 10/2013 | Fu et al. | 375/240.02 |
| 8,577,164 B2* | 11/2013 | Strom et al. | 382/243 |
| 2004/0252903 A1 | 12/2004 | Chen et al. | |
| 2006/0133511 A1* | 6/2006 | Chen et al. | 375/240.24 |
| 2007/0053426 A1* | 3/2007 | Lee et al. | 375/240 |
| 2008/0101707 A1* | 5/2008 | Mukherjee et al. | 382/236 |
| 2008/0243971 A1* | 10/2008 | Po et al. | 708/4 |
| 2009/0141796 A1* | 6/2009 | Cham et al. | 375/240.03 |
| 2010/0074323 A1* | 3/2010 | Fu et al. | 375/240.02 |
| 2011/0235928 A1* | 9/2011 | Strom et al. | 382/233 |
| 2011/0261888 A1* | 10/2011 | Cammas et al. | 375/240.24 |
| 2012/0020549 A1* | 1/2012 | Lee et al. | 382/154 |
| 2012/0121013 A1* | 5/2012 | Lainema et al. | 375/240.12 |
| 2013/0266063 A1* | 10/2013 | Jun et al. | 375/240.12 |
| 2013/0301707 A1* | 11/2013 | Lai et al. | 375/240.03 |

* cited by examiner

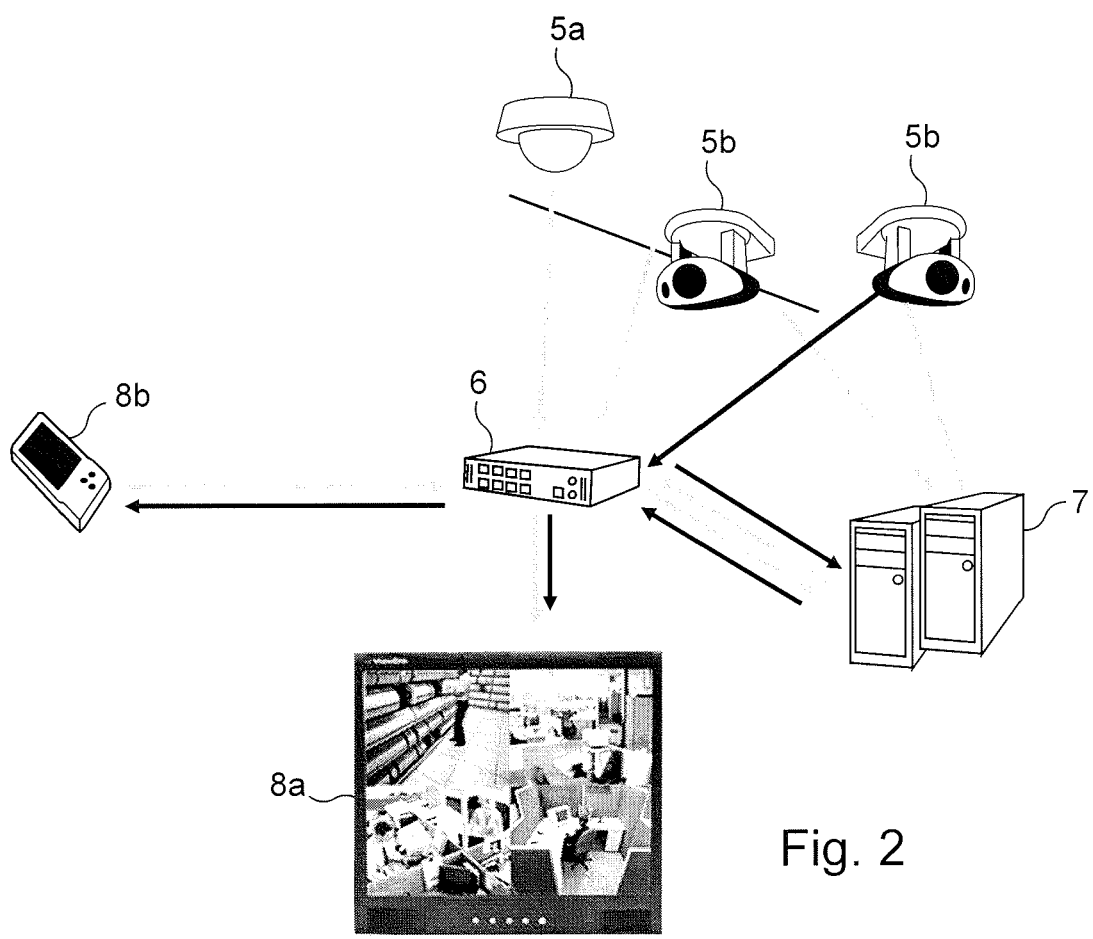
Fig. 2
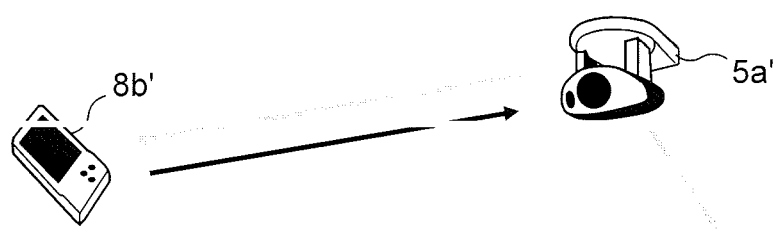
Fig. 3
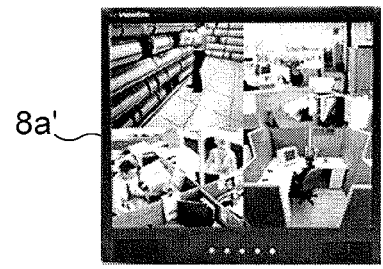

METHOD AND DEVICE FOR CODING A SEQUENCE OF IMAGES

BACKGROUND OF THE INVENTION

1. Field of the Invention

The present invention concerns a method and a device for coding a sequence of images.

More particularly, it concerns the coding of an image sequence comprising at least one image sequence fragment decodable independently of the rest of the image sequence.

2. Description of the Related Art

When a camera captures a sequence of images or video, that sequence of images is coded in a video compression format. The sequence of images is thus converted into a compressed video data stream.

The coding methods used are standard video coding methods, such as the H.264/AVC standard, providing functionalities for accessing and extracting a video fragment in a compressed data stream.

Thus, these coding methods have functionalities making it possible to view an image region of interest over a time interval or video fragment. For this, the compressed video data stream must contain spatio-temporal access points enabling the extraction of a part of the compressed data stream, or data sub-streams, containing data corresponding to the image region of interest. These coding methods enable the data stream to be divided into several data sub-streams that are individually decodable.

For example, the H.264/AVC video standard divides the image to code into groups of macroblocks or slice groups. Each slice group is coded so as to be individually decodable.

On coding an image, the coding methods use spatial and temporal predictions.

Spatial prediction enables an image block to be coded predictively on the basis of neighboring image blocks.

Temporal prediction enables an image block to be coded predictively on the basis of at least one reference image.

The spatial and temporal predictions used by the coding methods are known to the person skilled in the art and will not be described in more detail.

The coding methods constrain the spatial and temporal predictions in order for each slice group to be decodable independently of the other slice groups.

FIG. 1 illustrates a sequence of images 1 coded using known coding methods, having a functionality for accessing and extracting a data sub-stream corresponding to an image region of interest over a time interval (video fragment or image sequence fragment). This data sub-stream or video fragment is included in the data stream corresponding to a sequence of images, and is decodable independently of the rest of the data stream.

Each image 1a of the sequence of images 1 is divided into macroblocks 1b. A macroblock 1b is, for example, a block of 16×16 pixels.

This sequence of images 1 has an image region of interest 2 over a time interval. Thus, the image region of interest 2 is represented on each image 1a belonging to a subset of images 3 corresponding to the time interval.

In order to provide the access to that image region of interest 2 over the time interval (video fragment or image sequence fragment), the coding methods, for example the H.264/AVC coding, define, in each image of the subset of images 3, a group of macroblocks or slice group 4 containing the macroblocks 1b having an intersection with the image region of interest 2.

Thus, in this example, each image 1a belonging to the subset of images 3 comprises two slice groups, a first slice group 4 corresponding to the image region of interest 2, and a second slice group 4a corresponding to the rest of the image 1a.

In this example, slice group 4 corresponding to the image region of interest 2 is of rectangular geometric shape. This geometric shape is thus defined prior to the coding process of each slice group 4, 4a.

Since each slice group 4, 4a must be able to be decoded independently of the other, no spatial prediction is possible between macroblocks 1b belonging to different slice groups 4.

Consequently, this constraint on the spatial prediction reduces the compression efficiency of certain macroblocks, in particular macroblocks situated on the edge of the image region of interest 2, since certain neighboring macroblocks cannot be used at the time of the coding.

Furthermore, the temporal prediction of the macroblocks of the slice group 4 corresponding to the image region of interest 2, is only implemented with reference to macroblocks also belonging to the slice group corresponding to the region of interest in the reference image or images.

This constraint on the temporal prediction is also detrimental to the compression efficiency. In particular, if an object of the image is not present in the slice group corresponding to the region of interest on the reference image or images, the macroblocks containing that object must be coded in INTRA, that is to say using spatial predictions only. INTRA is much more costly in terms of size of the data necessary for coding the macroblock.

SUMMARY OF THE INVENTION

The present invention is directed to solving the aforesaid limitations and to providing a method of coding a sequence of images and a device associated with that method, making it possible to improve the compression efficiency for a sequence of images in a compressed data stream, the sequence of images comprising at least one video fragment, or image sequence fragment, independently decodable of the rest of the image sequence.

To that end, according to a first aspect, the present invention concerns a method of coding a sequence of images comprising at least one image comprising an image region of interest.

According to the invention, the coding method comprises the following steps implemented for said at least one image of said sequence of images:

determining an image portion comprising said image region of interest on the basis of a rate-distortion criterion representing a compromise between the compression efficiency and distortion of said image portion and the compression efficiency and distortion of the whole of said at least one image; and coding said at least one image on the basis of the determined image portion.

Thus, the image portion is optimized so as to give better compression efficiency while maintaining a good image quality.

More particularly, by virtue of this definition of the image portion, the image portion does not correspond uniquely to the image parts or macroblocks having an intersection with the image region of interest, but to the image parts or macroblocks which have a high influence on the compression efficiency, of both the image portion, and of the entire image.

According to a feature, at the coding step, the image portion is coded independently of the rest of said at least one image.

Consequently, the image portion comprising the image region of interest may be decoded without requiring the entire image to be decoded.

This is particularly advantageous when a sequence of images is coded in a data stream in a first terminal and when it is desired to view a region of interest on at least one image of the sequence of images in a second terminal, those terminals being linked by a communication network.

In this case, only a part of the codestream corresponding to the image portion (comprising the region of interest) is transmitted to the second terminal, which enables a reduction in the transmission time of the codestream, as well as a saving in terms of the communication network bandwidth.

In practice, said at least one image is divided into image blocks and the determining step comprises, for each image block of a sub-group of image blocks, determining a set of image blocks belonging to said image portion on the basis of the rate-distortion criterion.

Thus, each image block is gone through and a decision is taken concerning the inclusion or not of the image block in the image portion.

Determining a set of image blocks comprises a step of estimating the rate-distortion costs of said image portion and of the whole of said at least one image, the rate-distortion costs respectively representing the impact, associated with the coding of said image block, on the rate and the distortion of said image portion, and the impact, associated with the coding of said image block, on the rate and the distortion of the whole of said at least one image.

Determining a set of image blocks further comprises a step of estimating the cumulative rate-distortion cost associated with a current block representing the sum of the rate-distortion cost of said current block and the rate-distortion cost of a preceding block.

Consequently, if the rate-distortion cost associated with the preceding block is taken into account for estimating the rate-distortion cost associated with each block, the rate-distortion cost associated with a current block takes into account the rate-distortion costs of the image blocks processed beforehand.

Determining a set of image blocks comprises associating a belonging parameter representing the belonging of a current block to said image portion, it being possible for said belonging parameter to have a first value representing the belonging of said current block to the image portion and a second value representing the non-belonging of the current block to the image portion.

Thus, when the belonging parameter has the first value, the current block forms part of the image portion, and when it has the second value, the current block does not form part of the image portion.

The rate-distortion cost depends on said belonging parameter associated with a current block and with a preceding block.

Consequently, for a current block, the rate-distortion takes into account the values of the belonging parameters of the blocks processed previously.

For each value of said belonging parameter associated with the current block, the coding method comprises steps of:
 estimating the rate-distortion costs when the belonging parameter associated with the preceding block respectively has the first value and the second value, the estimated rate-distortion costs constituting a set of rate-distortion costs;
 selecting a minimum rate-distortion cost from the set of rate-distortion costs; and
 storing the coding parameters and the values of the belonging parameters associated with said minimum rate-distortion cost.

Thus, coding parameters are obtained which minimize the rate-distortion cost associated with the current block.

Consequently, for each macroblock of the image, the coding parameters and the values of the belonging parameters are obtained.

The macroblocks belonging to the image portion are thus obtained, that is to say the image portion making it possible to reach a good rate-distortion compromise for the image portion and for the entire image.

For example, the sub-group of image blocks corresponds to the whole of said at least one image.

According to one embodiment, the determining step comprises, for said at least one image of the sequence of images, selecting a shape for the image portion from among a set of candidate shapes for the image portion, on the basis of the rate-distortion criterion.

Thus, for each image of the sequence of images, an image portion shape is selected.

According to a feature, selecting a shape comprises estimating a rate-distortion cost associated with the coding of the image portion with the shape and a rate-distortion cost associated with the coding of the whole of said at least one image.

The rate-distortion criterion takes into account a rate-distortion cost of said image portion and a rate-distortion cost of the whole of said at least one image, said rate-distortion costs being attributed a weighting coefficient.

Thus, the impact on the rate and the distortion for the image portion and for the entire image may be adjusted so as to reach a compromise between the two of them.

According to a second aspect, the present invention concerns a device for coding a sequence of images comprising at least one image comprising an image region of interest.

According to the invention, the device comprises the following means:
 means for determining an image portion comprising the image region of interest on the basis of a rate-distortion criterion representing a compromise between the compression efficiency and distortion of the image portion and the compression efficiency and distortion of the whole of said at least one image; and
 means for coding said at least one image on the basis of the determined image portion.

According to a feature, the coding means are adapted to code the image portion independently of the rest of said at least one image.

According to another feature, the means for determining an image portion comprise means for determining a set of image blocks belonging to the image portion on the basis of the rate-distortion criterion.

According to another feature, the coding device comprises means for estimating the rate-distortion costs of the image portion and of said at least one image, the rate-distortion costs respectively representing the impact, associated with the coding of the image block, on the rate and the distortion of said image portion, and the impact, associated with the coding of the image block, on the rate and the distortion of said at least one image.

In practice, the device further comprises means for estimating the cumulative rate-distortion cost associated with a current block representing the sum of the rate-distortion cost of the current block and the rate-distortion cost of a preceding block.

According to a feature, the device comprises means for:

estimating the rate-distortion costs when a belonging parameter associated with the preceding block respectively has a first value and a second value, the estimated rate-distortion costs constituting a set of rate-distortion costs;

selecting a minimum rate-distortion cost from the set of rate-distortion costs; and storing the coding parameters and the values of the belonging parameters associated with the minimum rate-distortion cost.

According to a third aspect, the present invention concerns an apparatus for acquiring a sequence of digital images, of digital camera type, comprising a coding device in accordance with the invention.

According to a fourth aspect, the present invention concerns an information storage means which can be read by a computer or a microprocessor storing instructions of a computer program, adapted to implement a coding method in accordance with the invention, when said information is read by said computer or said microprocessor.

In a particular embodiment, this storage means is partially or totally removable.

According to a fifth aspect, the present invention concerns a computer program product able to be loaded into a programmable apparatus, comprising sequences of instructions for implementing a coding method in accordance with the invention, when said computer program product is loaded and executed by said programmable apparatus.

The advantages and particular features of the apparatus for acquiring a sequence of digital images, of the information storage means and of the computer program products are similar to those of the coding method they implement.

BRIEF DESCRIPTION OF THE DRAWINGS

Still other particularities and advantages of the invention will appear in the following description, made with reference to the accompanying drawings which are given by way of non-limiting examples, and in which:

FIG. 2 schematically represents a first context of the present invention;

FIG. 3 schematically represents a second context of the present invention;

DESCRIPTION OF THE EMBODIMENTS

With reference to FIG. 2, a description will first of all be given of a context in which the invention is situated.

Figure 1:
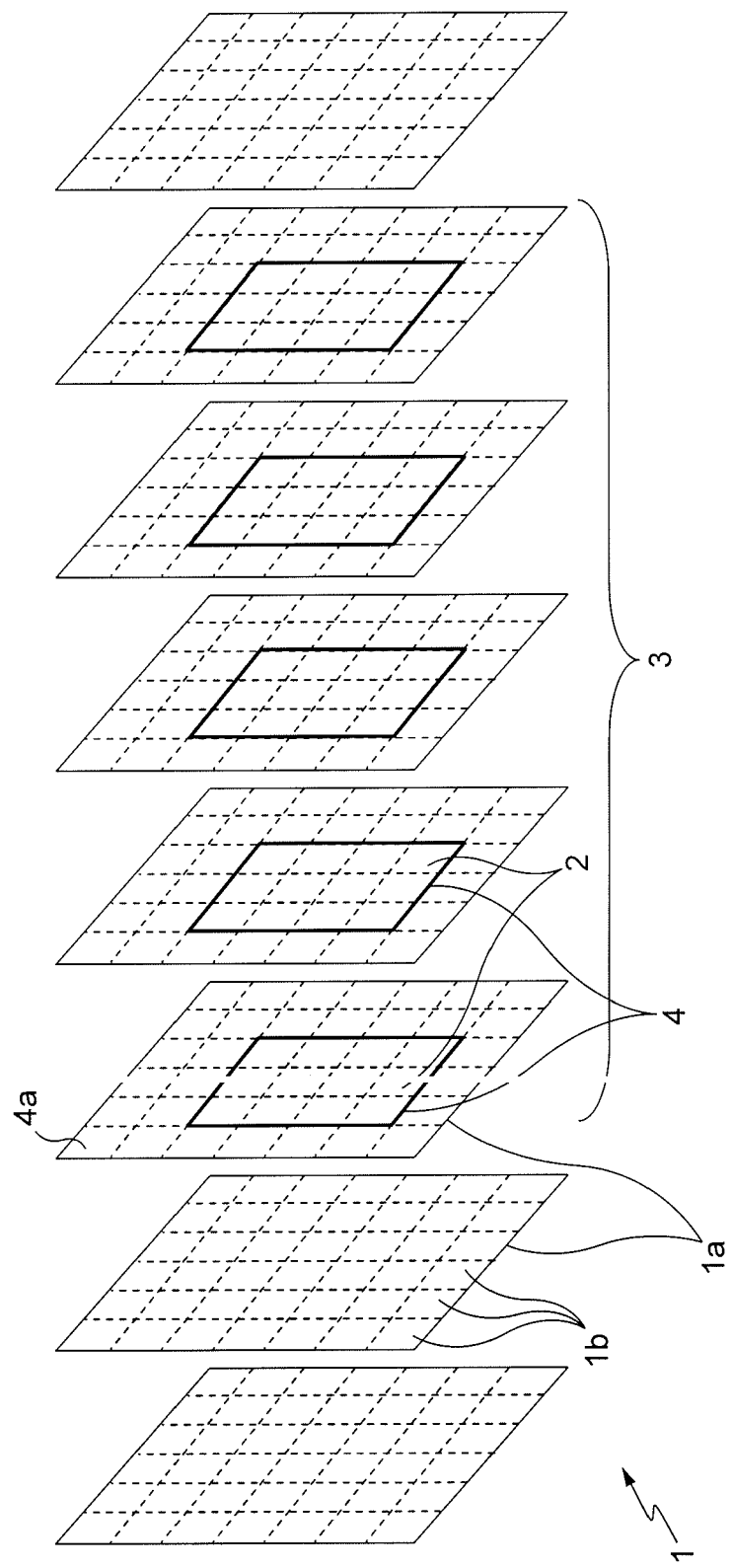
FIG. 1 represents a sequence of images.

FIG. 2 represents a set of digital cameras 5a, 5b adapted to take a sequence of images or video 1 (FIG. 1).

The digital cameras 5a, 5b are linked to an application server 6 and to a storage server 7.

The digital cameras 5a, 5b are adapted to code the sequence of images 1 taken, so generating a digital video stream which is transmitted to the application server 6 and to the storage server 7.

The digital cameras 5a, 5b are provided with a scene analysis tool capable of detecting particular events in the scene or alarms.

An alarm corresponds to a subset of images of the sequence of images comprising an image region of interest, the sub-sets of images 3 (FIG. 1) corresponding to a time interval.

The application server 6 transmits the video stream generated to clients 8a, 8b.

The clients 8a, 8b are for example a video-surveillance station 8a and a station comprising an application for remote consultation 8b.

These clients 8a, 8b enable a user to view different video scenes in their entirety or video scenes corresponding to regions of interest, for example, regions of interest associated with an alarm detected by a digital camera 5a, 5b.

The coding method in accordance with the invention is implemented in the digital cameras 5a, 5b.

FIG. 3 represents a second application context of the coding method in accordance with the invention.

In this example, a digital camera 5a' is adapted to take a sequence of images 1, to code it in accordance with the invention, and to transmit it to several clients 8a', 8b', simultaneously.

As for the preceding application context, described with the aid of FIG. 2, the clients 8a', 8b' enable a user to view the different video scenes in their entirety or only a region of interest over an interval of time.

For example, a client 8b' may request the digital camera 5a' to send a sub-stream of data corresponding to an image region of interest over an interval of time or video fragment.

This video fragment may correspond to an alarm generated by the digital camera 5a'.

Figure 4:
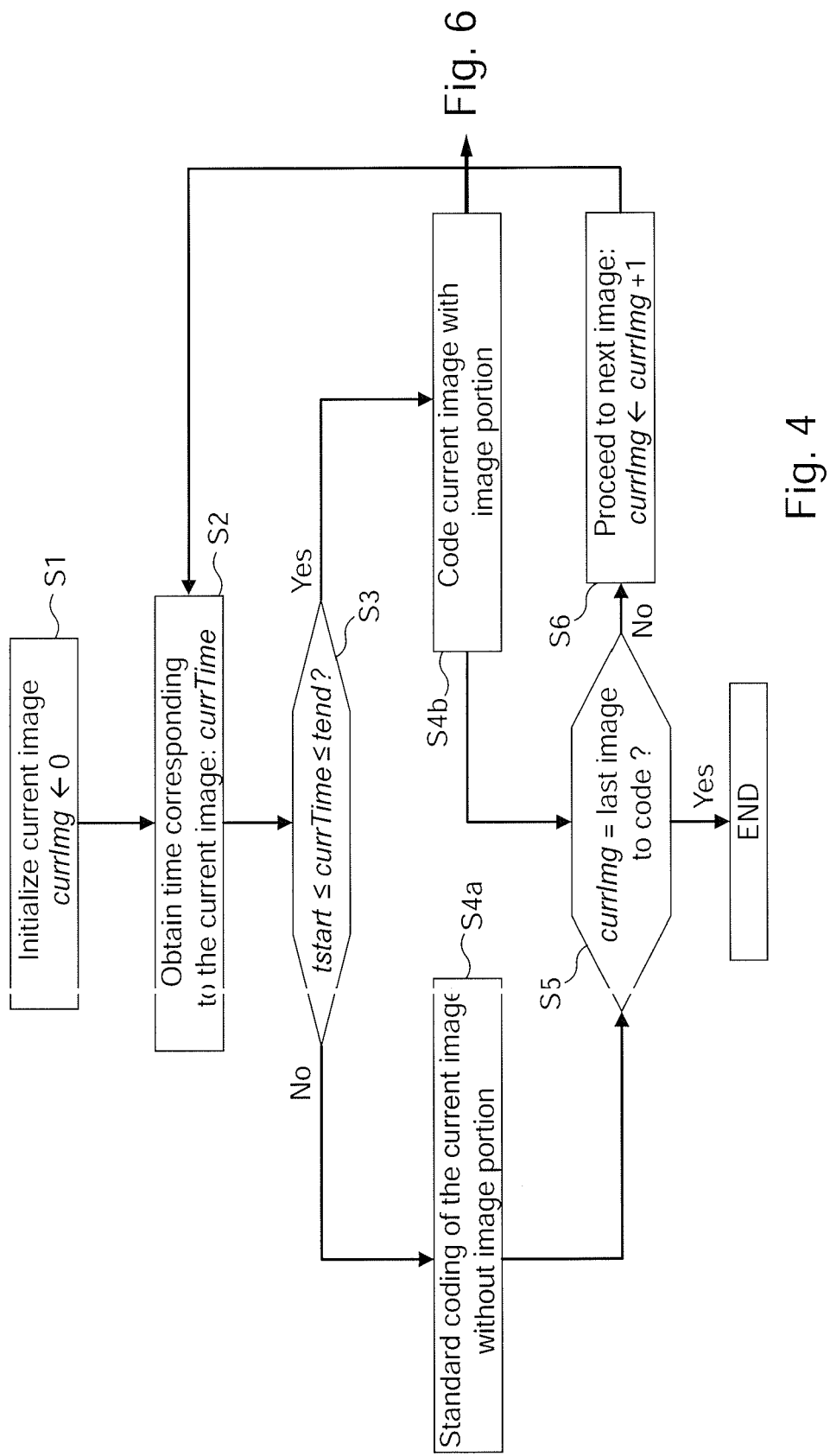
FIG. 4 is a flow chart representing an embodiment of a method of coding a sequence of images in accordance with the invention.

A description will next be given, with reference to FIG. 4, of a first embodiment of the method of coding a sequence of images 1 in accordance with the invention.

Figure 5:
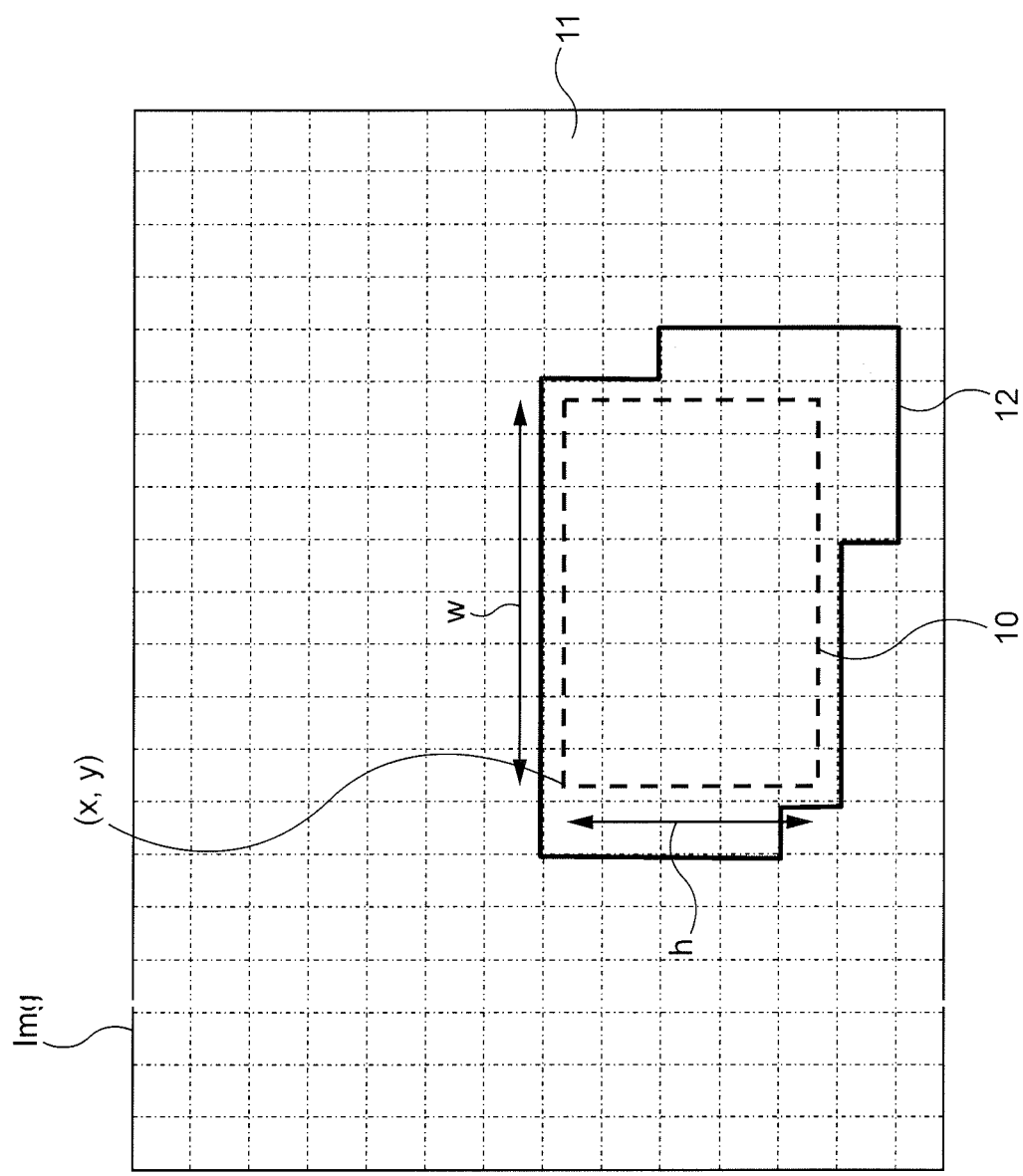
FIG. 5 represents an image comprising an image region of interest.

Reference is also made to FIG. 5 which represents an image Img belonging to the sequence of images to code. The sequence of images to code 1 or video sequence comprises at least one image Img having an image region of interest 10 over a time interval or video fragment, or image sequence fragment.

The coordinates (tstart, tend, x, y, w, h) of this video fragment are necessary for the implementation of the coding method in accordance with the invention.

These coordinates are composed of temporal coordinates tstart, tend and spatial coordinates x, y, w, h.

The coordinate tstart represents the start of the time interval of the video fragment 1, and the coordinate tend represents the end of the time interval. The spatial coordinates x, y, and the sizes w, and h enable the image region of interest 10 to be defined.

Here, the image region of interest 10 is of rectangular shape. Thus, the coordinates x, y correspond to the position of the vertex situated at top left of the rectangle corresponding to the image region of interest 10, and w,h correspond respectively to its width and its height.

The coding method (FIG. 4) commences with a step S1 of initialization of the current image currImg.

This step consists of selecting the first image of the image sequence 1.

Next, the point in time currTime corresponding to that current image currImg is obtained at an obtaining step S2.

At a verifying step S3, it is verified whether the point in time currTime obtained at obtaining step S2 belongs to the time interval corresponding to the video fragment, that is to say whether the time obtained belongs to the time interval [tstart, tend].

In the negative, that is to say when the image does not belong to the video fragment 1, the coding step S4a is proceeded to in which a standard video coding is implemented, for example H.264/AVC coding.

In the affirmative, coding step S4b is proceeded to, in which the current image currImg is coded using the coding method which will be described in detail with reference to FIG. 6.

Once the coding step S4a or S4b has been finalized, a second verifying step S5 is proceeded to, consisting of verifying whether the current image currImg is the last image to code, that is to say whether the current image currImg is the last image of the sequence of images 1.

In the affirmative case, the method of coding the sequence of images 1 is finished.

In the negative case, at a selecting step S6, the following image is selected, and the obtaining step S2 is then proceeded to in order to code the new current image currImg.

Figure 6:
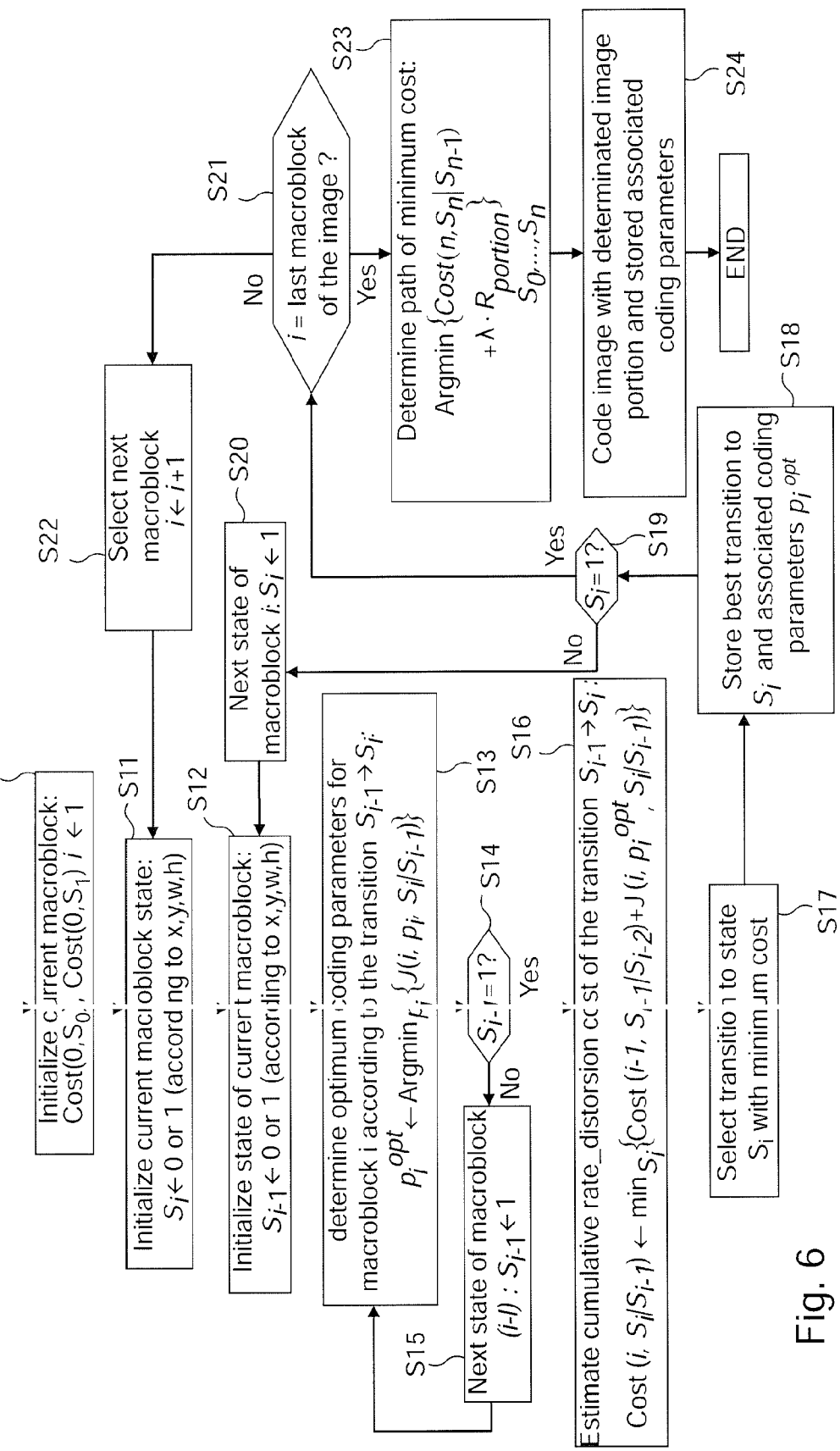
FIG. 6 is a flow chart representing an embodiment of a method of coding an image in accordance with the invention.

With reference to FIG. 6 a description will now be given of the method of coding an image belonging to the video fragment or image sequence fragment (step S4b of FIG. 4) according to a first embodiment.

This method is implemented for each image belonging to the image sequence fragment, that is to say for each image Img with which is associated a point in time currTime belonging to the time interval [tstart, tend].

This image Img thus comprises an image region of interest 10 having a rectangular shape with coordinates x, y, w and h (FIG. 5).

The image Img is divided into image blocks or macroblocks 11. On coding the image, these macroblocks 11 are coded successively.

As described above, this image region of interest 11 must be accessible in the digital stream corresponding to the coded sequence of images, that is to say that it must be possible to decode it without the necessity to decode the entire image Img.

The coding method in accordance with the invention comprises a step (not represented in the drawings and being composed of the steps S10 to S23 of FIG. 6) of determining an image portion 12. This image portion 12 thus comprises a group of macroblocks or slice group.

Consequently, determining the image portion 12 consists of determining the set of macroblocks 11 belonging to that image portion 12.

That image portion 12 is coded independently of the rest of the image Img.

Thus, it will be possible for the image region of interest 10 to be decoded without the necessity of decoding the entire image Img.

Thus, it will be possible for example to view the image region of interest 10 on the screen of a client 8a, 8b, 8a' without the necessity of decoding the entirety of the digital stream corresponding to the complete sequence of images.

At an initializing step S10, evaluation is made of the coding costs $Cost(0,S_0)$ and $Cost(0,S_1)$ of the first macroblock of the image, for a value of belonging to the region of interest respectively equal to 0 and 1. Next an image current block i or current macroblock i is selected.

This image current block i is here the second image block of the current image currImg.

A belonging parameter $S_i$ (belonging parameter for the macroblock i) representing the belonging of the image current block i to the image portion 12 is associated with each macroblock 11.

At an initializing step S11, the state of the current macroblock i is initialized. This step consists of associating a value with the belonging parameter $S_i$ of the image current block i or current macroblock i.

The value of the belonging parameter $S_i$ indicates the belonging or non-belonging of the current macroblock i to the image portion 12.

Here, the belonging parameter $S_i$ may have a first value which represents the belonging of the current macroblock i to the image portion 12, and a second value which represents the non-belonging of the current macroblock i to the image portion 12.

Thus, the current macroblock i may have two possible states, a first state or state of belonging to the image portion 12 (belonging parameter $S_i$ equal to the first value) and a second state or state of non-belonging to the image portion 12 (belonging parameter $S_i$ equal to the second value).

The association of the value of the belonging parameter $S_i$ with the current macroblock i is made on the basis of the position of the current macroblock i in the image relative to the spatial coordinates x and y and the sizes, w had h enabling the image region of interest 10 to be defined.

Thus, if the current macroblock i is situated within the image region of interest 10 or has an intersection with that image region of interest 10, the current macroblock i is included in the image portion 12.

In this case, the belonging parameter $S_i$ has the first value representing the belonging of the image current block i to the image portion 12, here the value 1.

If the current macroblock i is not situated within the image region of interest 10 or does not intersect with the image region of interest 10, the belonging of the current macroblock i to the image portion 12 will be determined subsequently, and the belonging parameter $S_i$ may have a value from among two possible values, the first value representing the belonging of the image current block i to the image portion 12 (here 1), and the second value representing the non-belonging of the image current block i to the image portion 12 (here 0).

Next, a third initializing step S12 is implemented, consisting of initializing the state of the preceding macroblock i−1.

As for the current macroblock i, this third initializing step S12 consists in associating a value with the parameter of the belonging of the preceding macroblock i−1 to the image portion 12.

Thus, the value of the belonging parameter has the first value representing the belonging of the preceding image-block i−1 to the image portion 12 if the preceding macroblock i−1 is situated within the image region of interest 10 or has an intersection with the image region of interest 10.

On the contrary, if the preceding macroblock i−1 is not situated within the image region of interest 10 or does not intersect with the image region of interest 10, the belonging parameter $S_{i-1}$ may have a value from among two possible values, the first value representing the belonging of the preceding image-block i−1 to the image portion 12 (here 1) and the second value representing the non-belonging of the preceding image-block i−1 to the image portion 12 (here 0).

Thus, in this example, the belonging parameter of the preceding macroblock i−1 may have the value 1 (state of belonging to the image portion of the macroblock) or a value from among the values 0 and 1 (two possible states, state of belonging and non-belonging to the image portion 12).

At the second and third initializing steps S11, S12, if the current i and preceding i−1 macroblocks are not situated within the image region of interest 11 or if they do not intersect with the image region of interest 11, the current i and preceding i−1 macroblocks are initialized to the state of non-belonging to the image portion.

Thus, the value associated with the belonging parameters of the current i and preceding i−1 macroblocks is the second value, here the value 0.

Thus, for a pair of values of the belonging parameters $S_i$, $S_{i-1}$ respectively corresponding to the current macroblock $S_i$ and to the preceding macroblock $S_{i-1}$, a step S13 of determining the optimum coding parameters $p_i^{opt}$ is implemented.

The implementation of this determining step S13 will be explained in detail with the aid of FIG. 7.

At a verifying step S14, it is verified whether possible values remain to select for the belonging parameter $S_{i-1}$ of the preceding macroblock i−1, that is to say whether possible states remain for the preceding macroblock i−1.

In this example, this verifying step S14 consists in verifying whether the value of the belonging parameter $S_{i-1}$ is equal to 1.

If the value of the belonging parameter $S_{i-1}$ for the preceding image-block i−1 is equal to the second value or to the value 0 in this example, a step S15 is proceeded to, of selecting the next state for the preceding macroblock i−1.

The following state is then the belonging state. Thus, the value associated with the belonging parameter $S_{i-1}$, at the selecting step S15, is the first value, here 1.

Next, there is implemented the step S13 of determining the optimum coding parameters $p_i^{opt}$ for that new pair of values formed by the belonging parameters $S_i$, $S_{i-1}$ for the current macroblock i and for the preceding macroblock i−1.

Thus, once all the possible states of the preceding macroblock have been gone through, a set of optimum coding parameters $p_i^{opt}$ is obtained as a result of this determining step S13.

For example, if the value of the belonging parameter $S_i$ of the current macroblock i is equal to 0 and the value of the belonging parameter $S_{i-1}$ of the preceding macroblock i−1 may be one from among two possible values (that is to say that at the third initializing step, the value of the belonging parameter of the preceding macroblock has been initialized to 0), the determining step S13 is implemented for two pairs of values.

These two pairs of values, corresponding to the belonging values $S_i$, $S_{i-1}$, are (0,0) and (0,1). Thus, first coding parameters $p_i^{opt}$ are determined for the pair (0,0) and second coding parameters $p_i^{opt}$ are determined for the pair (0,1).

If, at the verifying step S14, no possible values of the belonging parameter $S_{i-1}$ remain to select for the preceding macroblock i−1, that is to say that the value of the belonging parameter $S_{i-1}$ is equal to 1, a step S16 is implemented of estimating a minimum rate-distortion cost from among a previously determined set of rate-distortion costs for each pair of values that is formed by the belonging parameters $S_i$, $S_{i-1}$ of the current macroblock 1 and of the preceding macroblock i−1.

The estimated rate-distortion costs for each pair of values of the belonging parameters $S_i$, $S_{i-1}$ are produced taking into account the coding parameters $p_i^{opt}$ determined at the determining step S13.

The estimated rate-distortion costs represent the rate-distortion cost associated with the transition from the belonging state of the preceding macroblock i−1 to the belonging state of the current macroblock i.

Figure 7:
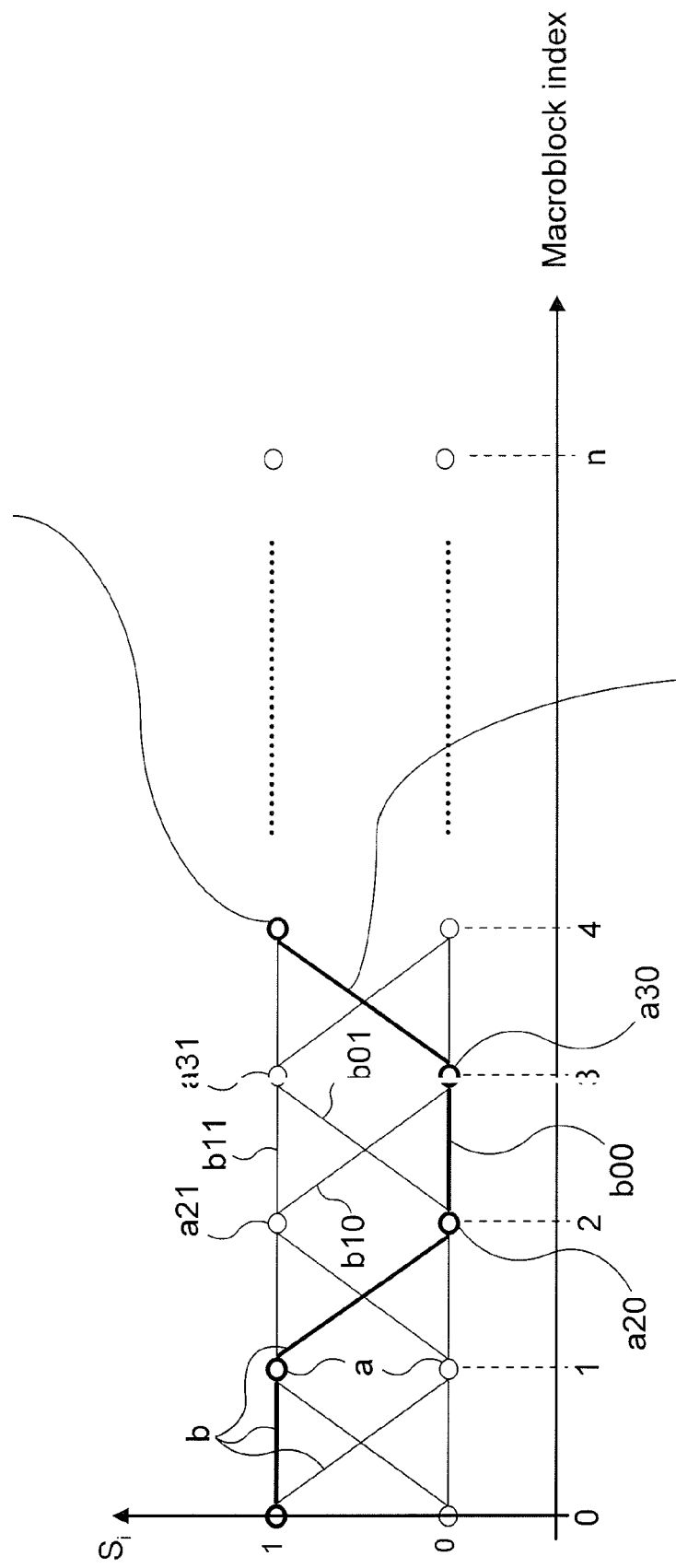
FIG. 7 represents a diagram used in the first embodiment of the coding method in accordance with the invention.

This estimating step S16 will be described in more detail when FIG. 7 is described.

Thus, at a second selecting step S17, selection is made of the pair of belonging values $S_i$, $S_{i-1}$ of the current macroblock i and of the preceding macroblock i−1 for which the rate-distortion cost is minimum.

Next, at a storing step S18, the pair of values for the belonging parameters $S_i$, $S_{i-1}$ of the current macroblock i and of the preceding macroblock i−1, as well as the associated coding parameters $p_i$ are stored in memory.

At a second verifying step S19, it is verified whether the last value of the belonging parameter $S_i$ of the current macroblock i has been processed, that is to say whether that parameter is equal to 1.

In the negative, at a third selecting step S20, the next value for the belonging parameter $S_i$ of the current macroblock i is selected.

Next the third step S12 is proceeded to of initializing the value of the belonging parameter $S_{i-1}$ for the preceding macroblock i−1.

Thus, for this new value of the belonging parameter $S_i$ for the current macroblock, the steps S12 to S20 described above are carried out.

In case of affirmative result at the second verifying step S19, verification is made at a third verifying step S21 of whether it is the last macroblock of the current image currImg.

If it is not the last macroblock of the current image currImg, selection is made at a fourth selecting step S22 of the next macroblock of the current image currImg and the second initializing step S11 is carried out of the value of the belonging parameter $S_i$ for the current macroblock i.

Next, steps S12 to S21 described above are carried out.

If at the third verifying step S21, the macroblock being processed or current macroblock i is the last macroblock of the current image currImg, a second step S23 is carried out of determining the minimum rate-distortion cost for the current macroblock i.

In this embodiment, the totality of the macroblocks forming the current image currImg is taken into account, that is to say the whole of the current image currImg.

Nevertheless, it is possible to use only a sub-group of macroblocks.

For example, it is possible to select a sub-group of macroblocks which surround the image region of interest. In this embodiment, the complexity is less.

As will be understand later in the description, in particular at the time of the description of FIG. 7, the rate-distortion cost associated with each state of the current macroblock i or with each value of the belonging parameter $S_i$ of the current macroblock i, represents the cumulative rate-distortion cost corresponding to the current macroblock i and to the set of preceding macroblocks of the image.

At this second determining step S23, determination is made of the value of the belonging parameters $S_i$ of the macroblocks composing the current image currImg.

Consequently, the image portion 12 is determined and corresponds to the set of the macroblocks having a belonging parameter $S_i$ equal to the first value, here the value 1.

Once the image portion 12 has been determined, a step S24 is carried out of coding the current image currImg on the basis of the determined image portion 12 and using the associated coding parameters $p_i^{opt}$ which were stored at the storing step S18.

As described above, the steps of FIG. 6 are implemented for each image belonging to the video fragment or image sequence fragment.

This video fragment or image sequence fragment is thus decodable independently of the rest of the sequence of images.

Consequently, a client 8a, 8b, 8a' may request the digital substream corresponding to the desired video fragment in order to decode the image fragment while maintaining a good compromise between the rate and the distortion.

This video fragment may correspond for example to an alarm generated by the digital camera which acquired the sequence of images.

Thus, the transmission time for the data, as well as the bandwidth used, are reduced.

A description will next be given, with reference to FIG. 7, of the estimation of the rate-distortion costs associated with the macroblocks (estimating step S16), of the determination of the coding parameters $p_i^{opt}$ (determining step S13), as well as of the determination of the minimum rate-distortion cost for a current macroblock (second determining step S23).

For each image macroblock, the coding methods seek to find the set of coding parameters $p_i^{opt}$ making it possible to minimize the distortion of reconstruction of an image under the constraint of a target rate.

This is represented by the following equations:

$$\text{Min}_p[D(p)]$$

$$R(p) \le Rc \quad (1)$$

where p represents the coding parameters for the macroblocks that it is sought to determine, D(p) represents the distortion over the whole image obtained with the coding parameters p, R(p) is the rate of the image obtained with the coding parameters p and $R_c$ represents the rate constraint allocated to the image under consideration.

If this equation is reformulated in a Lagrangian form, the obtainment of the optimum coding parameters of equation (1) becomes the following:

$$p = \text{Argmin}_p J(p)$$

$$J(p) = D(p) + \lambda R(p) \quad (2)$$

in which $\lambda$ is the Lagrange multiplier and depends on the rate at which it is desired to code the video sequence. For example, $\lambda$ is set on the basis of a quantization parameter employed for the coding of the image.

The rate R and the distortion D for a macroblock belonging to an image portion vary if the macroblocks coded previously belong or do not belong to the same image portion.

Thus, the belonging or non-belonging to the image portion 12 of the macroblocks i−1, i−2, . . . i−n coded prior to the coding of the current macroblock have an influence on the obtainment of the optimum coding parameters $p_i^{opt}$.

The belonging or non-belonging of each macroblock of a current image currImg to the image portion 12, that is to say the determination of the image portion 12 is for example implemented by means of the Viterbi algorithm.

Using this algorithm, the state of each current macroblock i of the current image Img is determined, and consequently the image portion 12 is determined.

For the implementation of this algorithm, the diagram represented in FIG. 7 is used.

The diagram represents a trellis representing the state of each macroblock of the image. The x-axis represents indices corresponding to the macroblocks of the image, the number of macroblocks in an image being n+1.

The y-axis represents the possible sates of each macroblock (0, 1, . . . , n).

As described above, the state of a current macroblock corresponds to the value of the belonging parameter $S_i$ of the current macroblock i.

It is to be recalled that the two possible states may be the belonging or non-belonging of the current macroblock i to the image portion 12, or, which amounts to the same thing, the belonging parameter $S_i$ may have a value from among two possible values, the first and the second value (here the values 0 or 1).

Each node a of the trellis corresponds to a possible state for a macroblock.

Thus, in this example, each macroblock (0, 1, . . . , n) has two associated nodes a, each node representing a possible state.

The branches of the trellis represented in FIG. 7 correspond to transitions between macroblocks.

In particular, each branch corresponds to a transition from a preceding macroblock i−1 with a given value of the belonging parameter $S_{i-1}$, to a current macroblock i with a given value of the belonging parameter $S_i$. It is to be noted that for the macroblocks belonging to the region of interest 10 or having an intersection with the region of interest 10, only the state of belonging of the macroblock to the image portion 12 is possible.

The belonging parameter $S_i$ can therefore only have the first value (value 1). The trellis of FIG. 7 thus has a single node for these macroblocks.

Thus, for example, between the third and fourth macroblock (preceding macroblock 2 and current macroblock 3), there are four possible branches of the trellis, corresponding to four possible transitions:

transition from the preceding macroblock 0 with a value of the belonging parameter $S_2=0$ to the current macroblock 1 with a value of the belonging parameter $S_3=0$ (branch b00), transition from the preceding macroblock 0 with a value of the belonging parameter $S_2=0$ to the current macroblock 1 with a value of the belonging parameter $S_3=1$ (branch b01), transition from the preceding macroblock 0 with a value of the belonging parameter $S_2=1$ to the current macroblock 1 with a value of the belonging parameter $S_3=0$ (branch b10), and transition from the preceding macroblock 0 with a value of the belonging parameter $S_2=1$ to the current macroblock 1 with a value of the belonging parameter $S_3=1$ (branch b11).

Each branch of the trellis has an associated rate-distortion cost which is linked to the transition between the preceding macroblock i−1 and the current macroblock i.

The rate-distortion cost linked to this transition is calculated using the following equation:

$$J(i, p_i, S_i | S_{i-1}, \ldots, S_0) = S_i \cdot w_{fragment} \cdot (D_i(p_i, |S_{i-1}, \ldots S_i, S_0) + \lambda R_i(p_i, S_i | S_{i-1}, \ldots, S_0)) + (1 - w_{fragment}) \cdot (D_i(p_i, Si | S_{i-1}, \ldots, S_0) + \lambda R_i(p_i, Si | S_{i-1}, \ldots, S_0)) \quad (3)$$

The first component of this equation (3) $|S_i \cdot w_{fragment} \cdot (D_i(p_i, |S_{i-1}, \ldots S_i, S_0) + \lambda R_i(p_i, S_i | S_{i-1}, \ldots, S_0)$ represents the impact on the rate and the distortion of the image portion 12 linked to the coding of the current macroblock i using the associated coding parameters $p_i$ and value of the belonging parameter $S_i$.

It should be noted that the rate-distortion cost is zero if the current macroblock i does not belong to the image portion, since the value of the belonging parameter $S_i$ is equal to 0.

The second component of the equation (3) $1 - w_{fragment} \cdot (D_i(p_i, Si | S_{i-1}, \ldots, S_0) + \lambda R_i(p_i, Si | S_{i-1}, \ldots, S_0)))$ represents the impact on the rate and the distortion of the entire image due to the coding of the current macroblock i with the associated coding parameters $p_i$ and value of the belonging parameter $S_i$.

Thus, the first component of equation (3) corresponds to the rate-distortion cost of the image portion 12, and the second component of the equation corresponds to the rate-distortion cost of the entire image Img.

As expressed by the equation, these rate-distortion costs have a weighting coefficient $w_{fragment}$ attributed to them.

This weighting factor $w_{fragment}$ is used to adjust the compromise between the compression efficiency of the image portion 12 and the compression efficiency of the whole image Img.

For example, according to one embodiment, the weighting factor $w_{fragment}$ may be set in advance to a value such that the decoding of an image portion comprising the image region of interest does not increase the coding rate for a sequence of images, by a given percentage, for example 10%.

In an embodiment, the coding rate of a macroblock $R_i(pi, S_i|S_{i-1}, \ldots, S0)$ may be estimated by means of a rate-distortion model progressively updated as the coding of the video sequence advances.

In this embodiment, the estimation of the rate is faster.

The cumulative rate-distortion cost is defined as the minimum rate-distortion cost of the different paths arriving at the node.

By "path" is meant all the consecutive branches (or transitions from a preceding macroblock i to a current macroblock i) between a first macroblock and a second macroblock.

Thus, for each current macroblock i, two cumulative rate-distortion costs are respectively associated with two nodes, a first node corresponding to the first state, and a second node corresponding to the second state.

The cumulative rate-distortion cost is thus determined using the following equation:

$$\text{Cost}(i, S_i|S_{i-1}, S_0) = \min_{S_{i-1}}\{\text{Cost}(i-1, S_{i-1}|S_{i-2}, \ldots, S_0) + J(i, S_i|S_{i-1}, S_0)\} \quad (4)$$

In this equation (4), the term $J(i, S_i|S_{i-1}, S_0)$ represents the rate-distortion cost linked to the transition between the preceding macroblock i−1 and the current macroblock i and the term $\text{Cost}(i-1, S_{i-1}|S_{i-2}, \ldots, S_0)$ represents the cumulative rate-distortion cost at the nodes corresponding to the preceding macroblock i−1.

Thus, for example, if the macroblock 2 is considered as preceding macroblock i−1, and the macroblock 3 as current macroblock i, the nodes associated with the macroblock 2 are a first node a20 for the state of non-belonging and a second node a21 for the belonging state, and those associated with the macroblock 3 are a first node a30 for the state of non-belonging and a second node a31 for the belonging state.

A first branch b00 represents the transition between the first node a20 associated with the preceding macroblock 2 and the first node a30 associated with the current macroblock 3.

A second branch b01 represents the transition between the first node a21 associated with the preceding macroblock 2 and the first node a31 associated with the current macroblock 3.

A third branch b10 represents the transition between the second node a21 associated with the preceding macroblock 2 and the first node a30 associated with the current macroblock 3.

A fourth branch b11 represents the transition between the second node a21 associated with the preceding macroblock 2 and the second node a31 associated with the current macroblock 3.

The cumulative rate-distortion cost is determined according to equation (4):

$$\text{Cost}(3, S_3|S_2) = \min_{S_3}\{\text{Cost}(2, S_2|S_1, S_0) + J(3, P_{3opt}, S_3|S_2, S_1, S_0)\} \quad (5)$$

The term $(\text{Cost}(2, S_2|S_1, S_0)$ represents the rate-distortion cost linked to the transmission between the macroblocks 2 and 3 and the term $(J(3, P_{3opt}, S_3|S_2, S_1, S_0))$ represents the cumulative rate-distortion cost for the first and second nodes a30, a31 of the current macroblock 3.

When the current macroblock i corresponds to the last macroblock of the image (index n), two paths are obtained between the first macroblock of the image (index 0) and the last macroblock of the image (index n) corresponding to the path comprising the minimum rate-distortion cost to arrive at that state.

Of these two paths, the path of the minimum rate-distortion cost indicates the image macroblocks belonging to the image portion, or, which amounts to the same thing, determines the image portion.

Equation (5) is applied for each node a30, a31 corresponding to the current macroblock 3.

Thus, for each node a30, a31 of the macroblock 3 the branch representing the lowest cumulative rate-distortion cost is obtained.

The two branches selected form a part of the minimum rate-distortion cost paths for respectively reaching the two states of the current macroblock 3.

Next, for the current macroblock 3, the minimum rate-distortion cost from among these two paths is chosen.

The procedure is the same with the current macroblock 4, considering the preceding macroblock 3, with the current macroblock 5 considering the preceding macroblock 4, etc.

Thus, when the last current macroblock n and the last preceding macroblock n−1 are considered, the path is chosen of minimum rate-distortion cost between the two minimum rate-distortion cost paths arriving at each node an0, an1.

The path of minimum rate-distortion cost is thus obtained, corresponding to the states having the minimum cumulative rate-distortion costs for each macroblock.

This is expressed with the following equation:

$$(S_0, \ldots, S_n) = \text{Argmin}(S_0, \ldots S_n)\left\{\sum_{i=0}^{n} J(i, S_{i-1}|S_{i-1}, \ldots, S_0) + \lambda \cdot R_{Portion}\right\} \quad (6)$$

$$= \text{Argmin}(S_0, \ldots, S_n)\left\{\text{Cost}(n, S_n|S_{n-1}, \ldots, S_0) + \lambda \cdot R_{Portion}\right\}$$

where $R_{Portion}$ represents the coding rate for the description of the shape of the portion corresponding to the path between the first macroblock 0 and the last macroblock n.

The values of the belonging parameters $(S_0, \ldots, S_n)$ are thus known for each macroblock of the current image Img.

Thus, the path of minimum cost found in the trellis gives the shape of the image portion 12 which will be coded in the current image currImg.

More particularly, the macroblocks to which has been attributed a value of the belonging parameter S equal to 1 are included in the image portion 12, and the other macroblocks belong to the rest of the image.

A description will next be given, with reference to FIG. 8, of a second embodiment of the determination of an image portion of the coding method in accordance with the invention.

As for the first embodiment, in this embodiment, the Viterbi algorithm is used.

Figure 8:
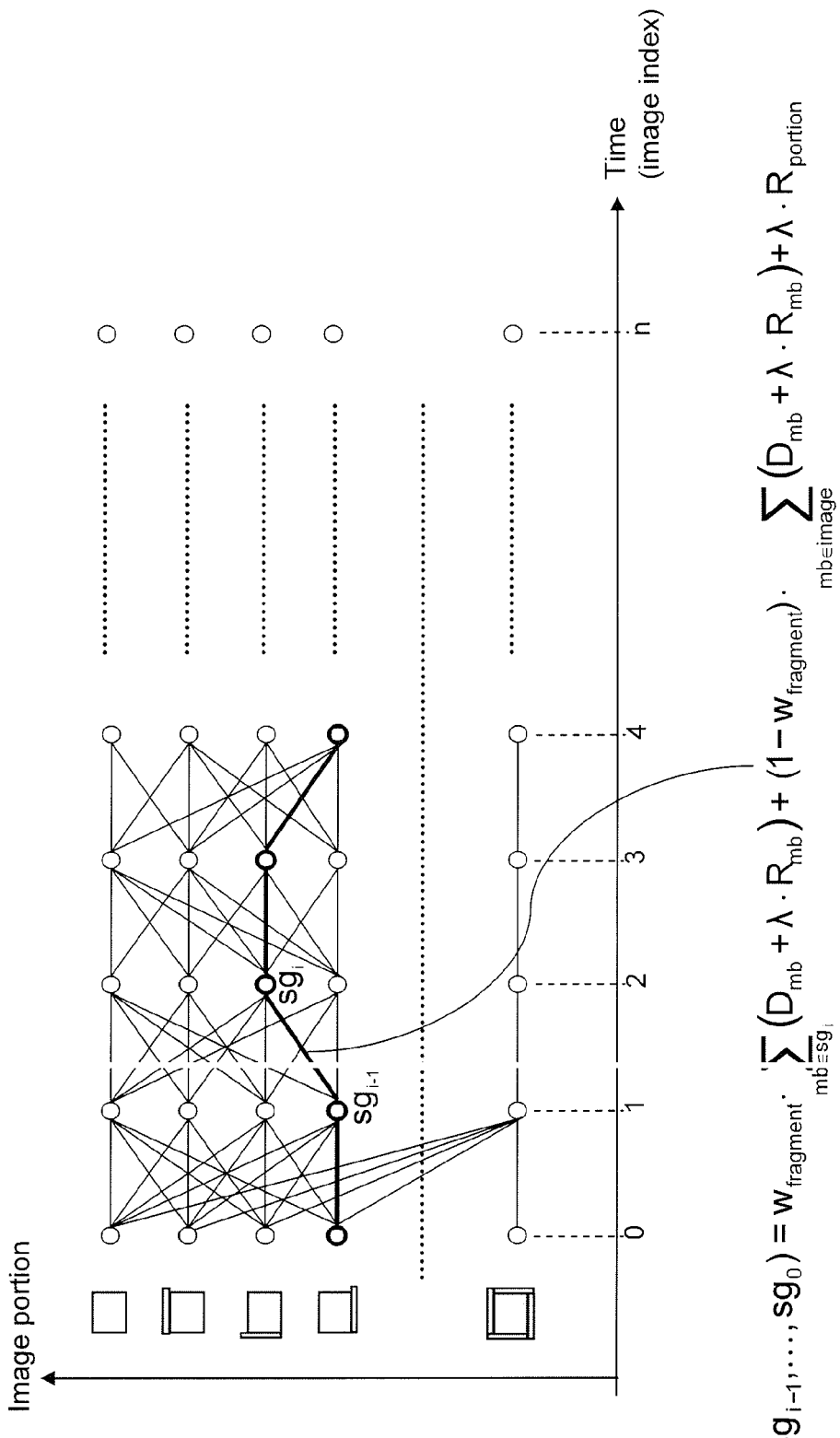
FIG. 8 represents a diagram used in a second embodiment of the coding method in accordance with the invention.

FIG. 8 represents a trellis used by this algorithm. The x-axis represents time. On this axis, the indices of the images of the sequence of images to code are represented.

On the y-axis, the different candidate shapes for the image portion are represented.

Each node of the trellis for a given image index, corresponds to the coding of the image portion in the image considered with a candidate shape.

A branch, or transition between two nodes belonging to two successive images i−1 and i, corresponds to the rate-distortion cost of the current image i with the shape of the portion $sg_i$ if the preceding image i−1 was coded with the shape of the image portion $sg_{i-1}$.

As for the first embodiment, this embodiment consists of searching for the path of minimum cumulative rate-distortion cost in the trellis of the Figure.

Here, the path of minimum cumulative rate-distortion cost corresponds to all the shapes of image portions which give the sum of the minimum rate-distortion costs over the images of the video fragment considered.

For example, the rate-distortion cost of the coding of an image i with a candidate image portion shape $sg_i$ is expressed in the following form, expressing the problem of the obtainment of the image portion in Lagrangian form:

$$J(i, sg_i | sg_{i-1}, \ldots, sg_0) = w_{fragment} \cdot \sum_{mb \in sgi} (D_{mb} + \lambda R_{mb}) + \quad (7)$$
$$(1 - w_{fragment}) \cdot \sum_{mb \in image} (D_{mb} + \lambda \cdot R_{mb}) + \lambda \cdot R_{Portion}$$

where:

$D_{mb}$ and $R_{mb}$ represent the distortion and the coding rate of a macroblock mb;

$w_{fragment}$ represents the weighting factor serving to adjust the compromise between the compression efficiency of the interior of the region of interest, and the compression efficiency on the entire scene.

The Lagrangian of equation (7) thus constitutes a weighted combination of two Lagrangians.

These two Lagrangians respectively correspond to the rate-distortion cost of the coding of the macroblocks of the candidate image portion and to the rate-distortion cost associated with the coding of the entire image, if the image portion takes the candidate shape $sg_i$.

It should be noted that this second embodiment uses a Lagrangian optimization similar to that of the first embodiment but this time in the temporal dimension.

$\lambda$ represents the Lagrange multiplier;

Image represents the set of all the macroblocks of an image;

Portion or $sg_i$ represents the set of all the macroblocks of the image portion comprising the region of interest;

$R_{Portion}$ represents the coding rate of the description of the shape of the image portion $sg_i$.

The search for the best path or path of minimum rate-distortion cost in the trellis of FIG. 8 follows the conventional Viterbi algorithm.

It consists of evaluating, for each node associated with a candidate image portion $sg_i$, for the current image i, the rate-distortion cost of the various transitions enabling that node to be attained.

The transition of minimum cost is chosen. This search is repeated for each image i of the time interval corresponding to the video fragment.

Once the last image n of this interval has been reached, at each candidate node $sg_n$, the rate-distortion cost is available for the best path enabling that node to be reached.

From among the various candidate image portions $sg_n$, selection is then made of those which are associated with a path through the whole of the trellis which has the minimum cumulative cost.

The associated path then gives all image portions for the images of the temporal interval considered, which gives the best rate-distortion compromise between coding efficiency of the image portion of the image region of interest and coding efficiency of the entire image.

This last determination may be summarized by the following equation:

$$(Sg_0, \ldots, sg_n) = \operatorname{Argmin}_{(sg_0, \ldots, sg_n)} \sum_{i=0}^{n} J(i, sg_i | sg_0, \ldots, sg_{i-1}) \quad (8)$$

Once the image portions for each image belonging to the image fragment have been found, the coding of the images of the image sequence is carried out (step S24 of FIG. 6).

Figure 9:
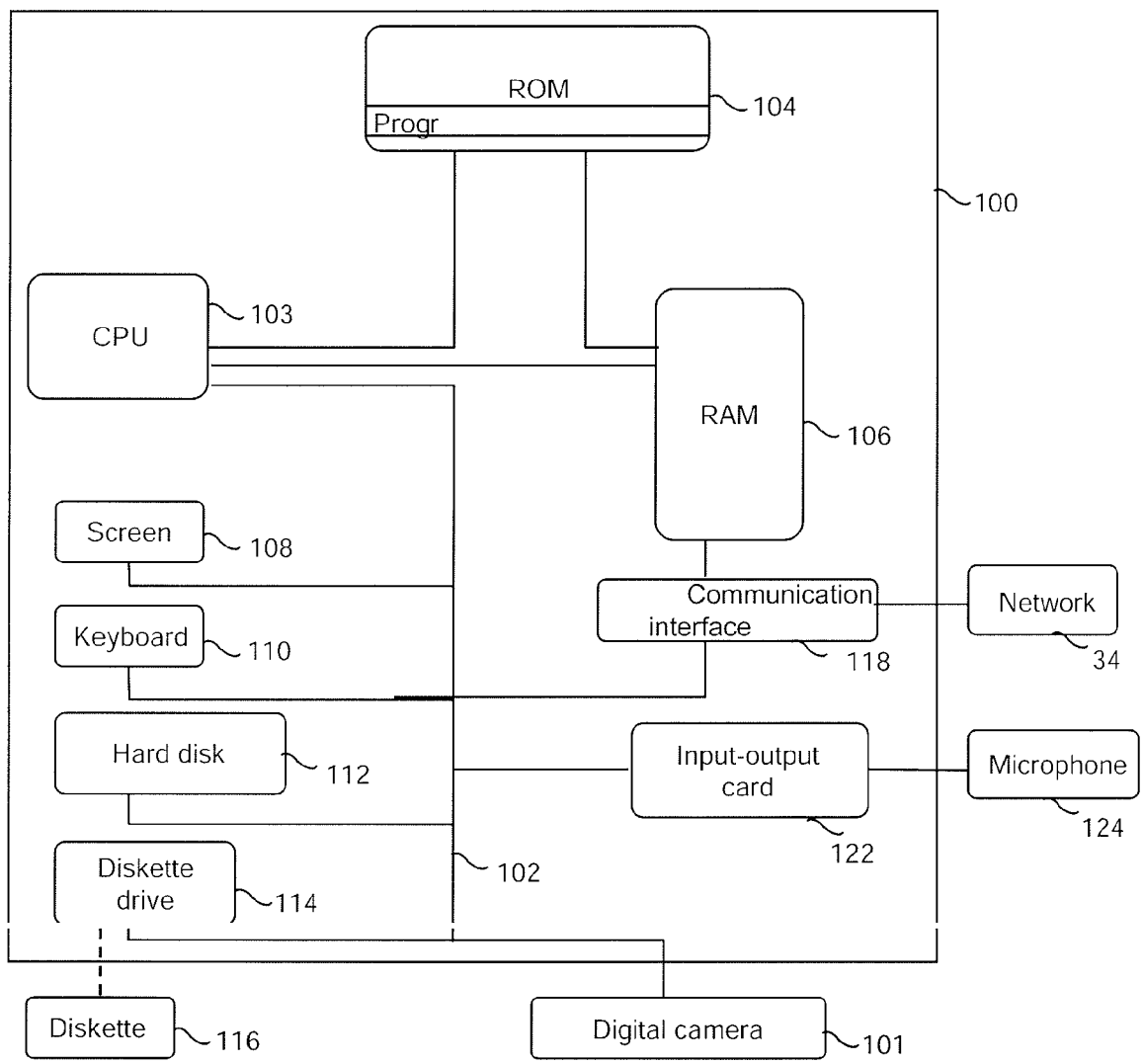
FIG. 9 schematically represents a particular embodiment of an apparatus capable of implementing the present invention.

FIG. 9 illustrates a device implementing a coding method in accordance with the invention, in a particular embodiment.

This device is for example a micro-computer 100 connected to or within various peripherals, in particular to a camcorder or digital camera (5a, 5b, 5a') linked to a graphics card and supplying information to process by the implementation of the present invention.

The device 100 comprises a communication interface 118 connected to a network 34 adapted to receive digital data to process by the device in the context of the implementation of the invention. The device 100 also comprises a storage means 112 such as a hard disk. It also comprises a drive 114 for a disk 116. This disk 116 may for example be a diskette, a CD-ROM, or a DVD-ROM, a memory card or a USB peripheral, for example. The disk 112 like the hard disk 116 can contain data processed according to the invention as well as the program or programs implementing the invention which, once read by the device 100, will be stored on the hard disk 112. As a variant, the program or programs enabling the device to implement the invention can be stored in Read Only Memory 104 (called ROM). In a second variant, the program or programs may be received in order to be stored in an identical manner to that described previously via the communication network 34.

The device 100 comprises an input-output card which is connected to a microphone 124. This same device has a screen 108 for displaying the data processed or serving as an interface with the user, who can thus select other data to process, using the keyboard 110 or any other means (a mouse, wheel or stylus, for example).

The central processing unit 103 (referred to as CPU in the drawing) executes the instructions relating to the implementation of the invention, which are stored in the read only memory 104 or in the other storage means. For example, the central processing unit carries out the steps illustrated in FIGS. 4, 6, 7 and 8. On powering up, the processing programs stored in a non-volatile memory, for example the ROM 104, are transferred into the random access memory RAM ("Random Access Memory") 106, which will then contain the executable code of the invention, as well as registers for storing the variables necessary for implementing the invention.

More generally, an information storage means, which can be read by a computer or microprocessor, integrated or not into the device, and which may possibly be totally or partially removable, is adapted to store one or more programs whose execution permits the implementation of the coding method according to the invention. Such a software application, when executed by the central processing unit 103, gives rise to the execution of the steps of the flowcharts/algorithms shown in FIGS. 4, 6, 7 and 8.

The means of a coding device adapted to implement the coding method in accordance with the invention described above comprise the central processing unit 103, the ROM 104, the RAM 106 and the hard disk 112.

A communication bus 102 affords communication between the different elements included in the device 100 or connected to it. The representation of the bus 102 is non-limiting and in particular the central processing unit 103 unit may communicate instructions to any element of the device 100 directly or by means of another element of the device 100.

Thus, by virtue of the invention, the image portion comprising the image region of interest is optimized so as to find a compromise between the compression efficiency and the distortion, both for the image portion and for the entire image.

Naturally, many modifications can be made to the embodiment described above without departing from the scope of the invention.

This application claims priority from French Patent Application No. 1056071 filed Jul. 23, 2010, which is hereby incorporated by reference herein in its entirety.

The invention claimed is:

1. A method of coding a sequence of images comprising at least one image (Img) comprising an image region of interest, the method being characterized in that it comprises the following steps implemented for the at least one image (Img) of the sequence of images:
   determining an image portion comprising the image region of interest on the basis of a rate-distortion criterion representing a compromise between the compression efficiency and distortion of the image portion and the compression efficiency and distortion of the whole of the at least one image (Img); and
   coding the at least one image (Img) on the basis of the determined image portion,
   wherein the at least one image (Img) is divided into image blocks and the determining step comprises, for each image block of a sub-group of image blocks of the divided image blocks, determining a set of image blocks belonging to the image portion on the basis of the rate-distortion criterion, wherein the sub-group of image blocks is a group of image blocks within the at least one image that is divided into image blocks.

2. A coding method according to claim 1, characterized in that at the coding step, the image portion is coded independently of the rest of the at least one image (Img).

3. A coding method according to claim 1, characterized in that determining a set of image blocks comprises a step of estimating a rate-distortion cost (J) associated with the coding of the image portion and a rate-distortion cost associated with the coding of the whole of the at least one image (Img).

4. A coding method according to claim 3, characterized in that determining a set of image blocks further comprises a step of estimating the cumulative rate-distortion cost (J) associated with a current block representing the sum of the rate-distortion cost (J) of the current block (i) and the rate-distortion cost (J) of a preceding block (i−1).

5. A coding method according to claim 1, characterized in that determining a set of image blocks comprises associating a belonging parameter ($S_i$) representing the belonging of a current block (i) to the image portion, it being possible for said belonging parameter ($S_i$) to have a first value representing the belonging of the current block (i) to the image portion and a second value representing the non-belonging of the current block (i) to the image portion.

6. A coding method according to claim 5, characterized in that the rate-distortion cost (J) depends on the belonging parameter ($S_i$) associated with a current block (i) and with a preceding block (i−1).

7. A coding method according to claim 5, characterized in that, for each value of the belonging parameter ($S_i$) associated with the current block (i), the method comprises steps of:
   estimating the rate-distortion costs (J) when the belonging parameter ($S_{i-1}$) associated with the preceding block (i−1) respectively has the first value and the second value, the estimated rate-distortion costs (J) constituting a set of rate-distortion costs;
   selecting a minimum rate-distortion cost from the set of rate-distortion costs (J); and
   storing the coding parameters ($p_i^{opt}$) and the values of the belonging parameters ($S_i$, $S_{i-1}$) associated with the minimum rate-distortion cost.

8. A coding method according to claim 1, characterized in that the sub-group of image blocks corresponds to the whole of the at least one image (Img).

9. A coding method according to claim 1, characterized in that the determining step comprises, for the at least one image (Img) of the sequence of images, selecting a shape ($sg_i$) for the image portion from among a set of candidate shapes ($sg_i$) for the image portion, on the basis of the rate-distortion criterion.

10. A coding method according to claim 9, characterized in that the selecting of a shape ($sg_i$) comprises estimating a rate-distortion cost associated with the coding of the image portion with the shape ($sg_i$) and a rate-distortion cost associated with the coding of the whole of the at least one image (Img).

11. A coding method according to claim 1, characterized in that the rate-distortion criterion takes into account a rate-distortion cost (J) of the image portion and a rate-distortion cost (J) of the whole of the at least one image (Img), the rate-distortion costs (J) being attributed a weighting coefficient ($W_{fragment}$).

12. An information storage means which can be read by a computer or a microprocessor storing instructions of a computer program, characterized in that it is adapted to implement a coding method according to claim 1, when the information is read by the computer or the microprocessor.

13. A means for storing information according to claim 12, characterized in that it is partially or totally removable.

14. A device comprising a non-transitory memory device storing computer program instructions which when executed performing the sequence of images coding according to claim 1.

15. A device for coding a sequence of images comprising at least one image (Img) comprising an image region of interest, the device being characterized in that it comprises the following means:
   means for determining an image portion comprising the image region of interest on the basis of a rate-distortion criterion representing a compromise between the compression efficiency and distortion of the image portion and the compression efficiency and distortion of the whole of the at least one image (Img);
   means for coding the at least one image (Img) on the basis of the determined image portion, and means for dividing the at least one image into image blocks, wherein the means for determining an image portion comprise, for each image block of a sub-group of image blocks of the divided image blocks, means for determining a set of image blocks belonging to the image portion on the basis of the rate-distortion criterion, wherein the sub-group of image blocks is a group of image blocks within the at least one image that is divided into image blocks.

16. A coding device according to claim 15, characterized in that the coding means are adapted to code the image portion independently of the rest of the at least one image (Img).

17. A coding device according to claim 15, characterized in that it comprises means for:
  estimating the rate-distortion costs (J) when a belonging parameter ($S_{i-1}$) associated with a preceding block (i−1) respectively has a first value and a second value, the estimated rate-distortion costs (J) constituting a set of rate-distortion costs;
  selecting a minimum rate-distortion cost from the set of rate-distortion costs (J); and
  storing the coding parameters ($p_i^{opt}$) and the values of the belonging parameters ($S_i, S_{i-1}$) associated with the minimum rate-distortion cost.

18. A method of coding a sequence of images comprising at least one image comprising an image region of interest, said method being characterized in that it comprises the following steps implemented for said at least one image of said sequence of images:
  determining a rate-distortion cost of an image portion comprising said image region of interest;
  determining a rate-distortion cost of the whole of said at least one image;
  attributing a weighting coefficient respectively to each said determined rate-distortion cost;
  determining said image portion on the basis of a rate-distortion criterion representing a compromise between the compression efficiency and distortion of said image portion and the compression efficiency and distortion of the whole of said at least one image, the rate-distortion criterion taking into account said determined rate-distortion costs, each rate-distortion cost being attributed a weighting coefficient; and
  coding said at least one image on the basis of said determined image portion,
  wherein the at least one image is divided into image blocks and the determining step comprises, for each image block of a sub-group of image blocks of the divided image blocks, determining a set of image blocks belonging to the image portion on the basis of the rate-distortion criterion, wherein the sub-group of image blocks is a group of image blocks within the at least one image that is divided into image blocks.

* * * * *